Oct. 20, 1970    R. SUTHERLAND ET AL    3,534,619
REGISTER DRIVE MEANS
Filed July 5, 1968                                    3 Sheets-Sheet 1
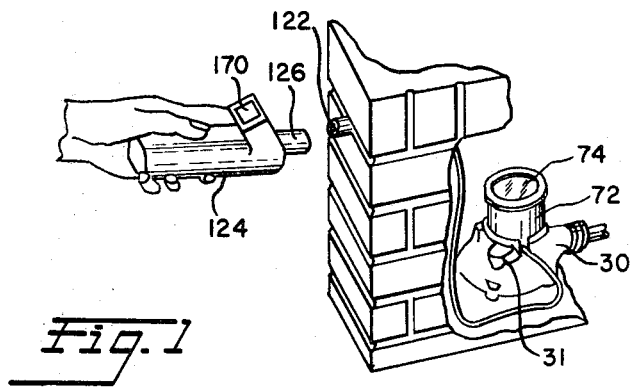
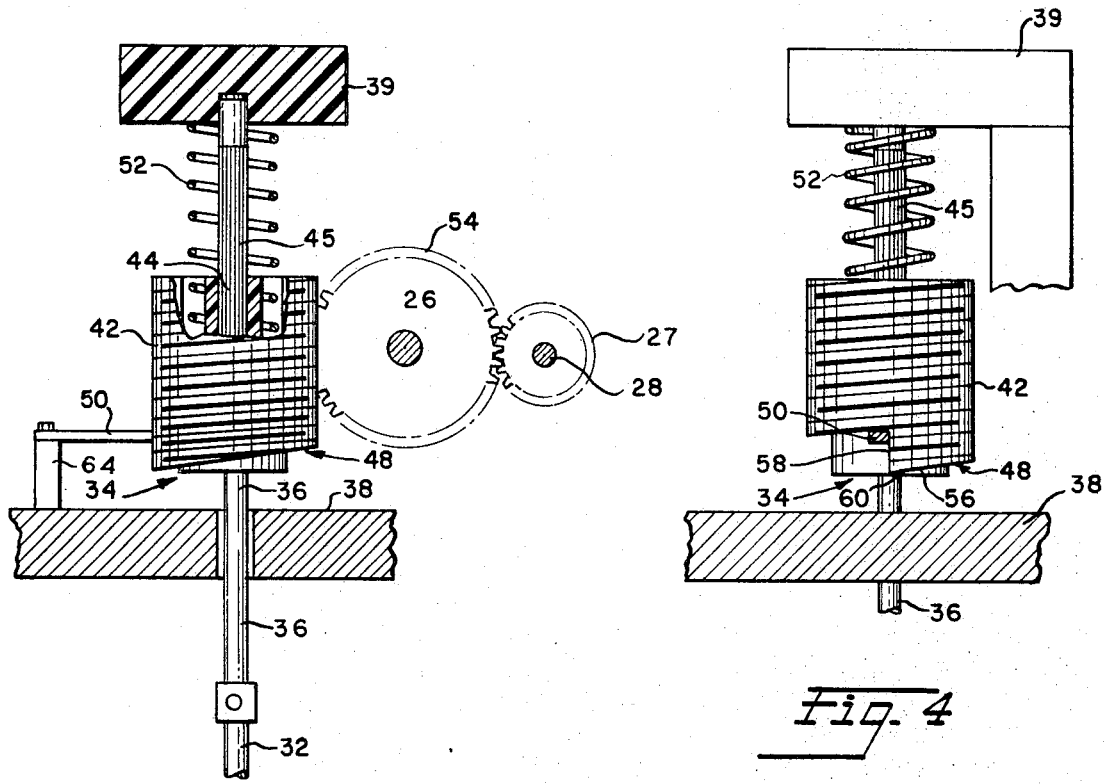
INVENTORS
RAY SUTHERLAND, ELMER F. PRINLEY
& EUGENE M. WEINBERGER
Strauch Nolan Neale Nies & Kurz
ATTORNEYS

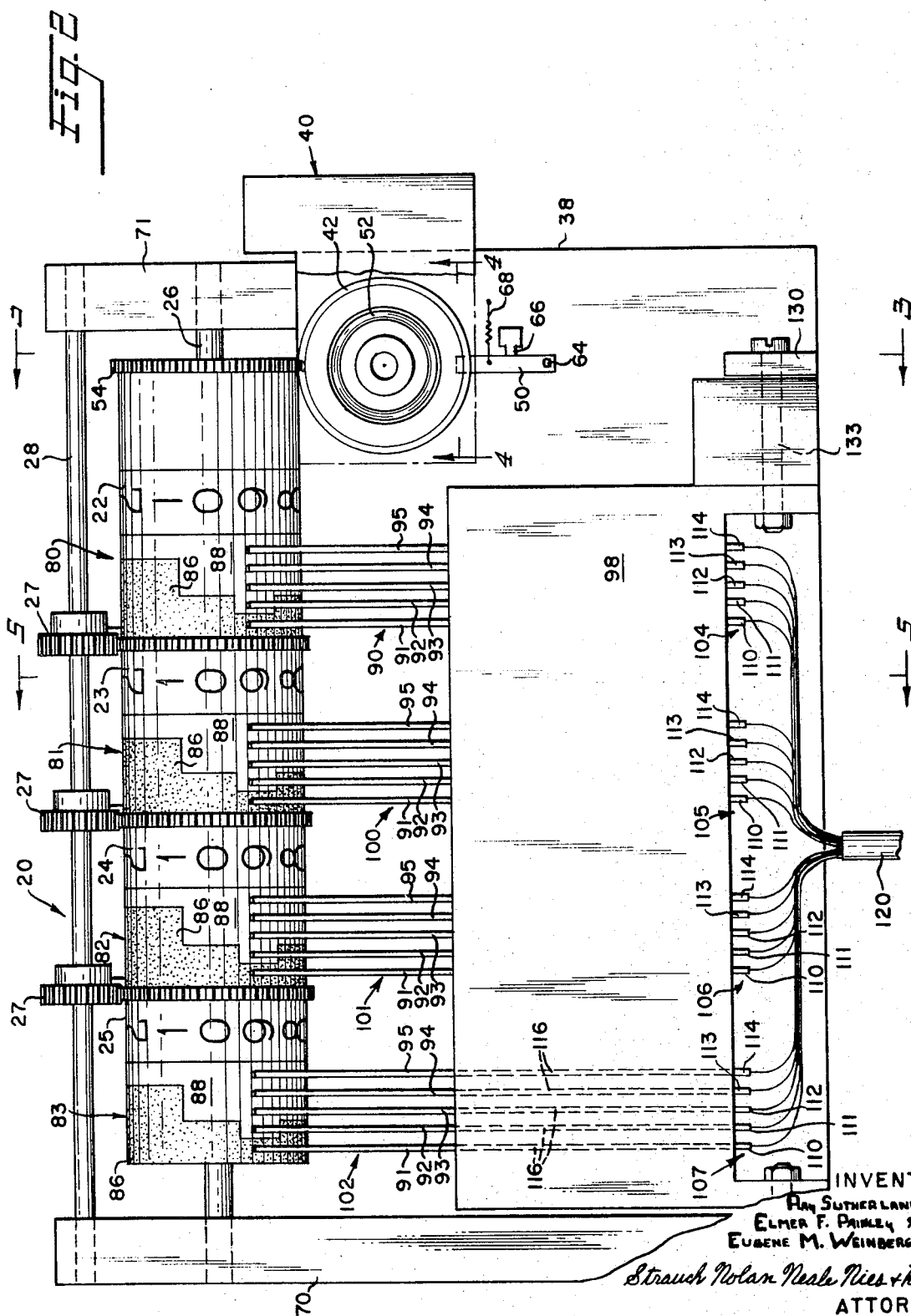

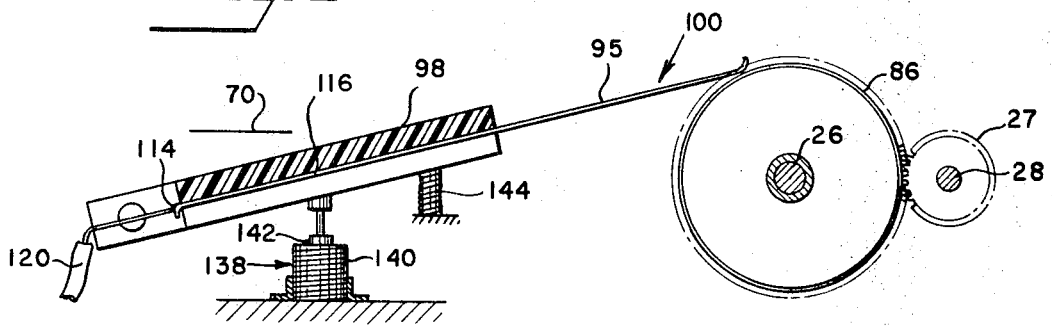
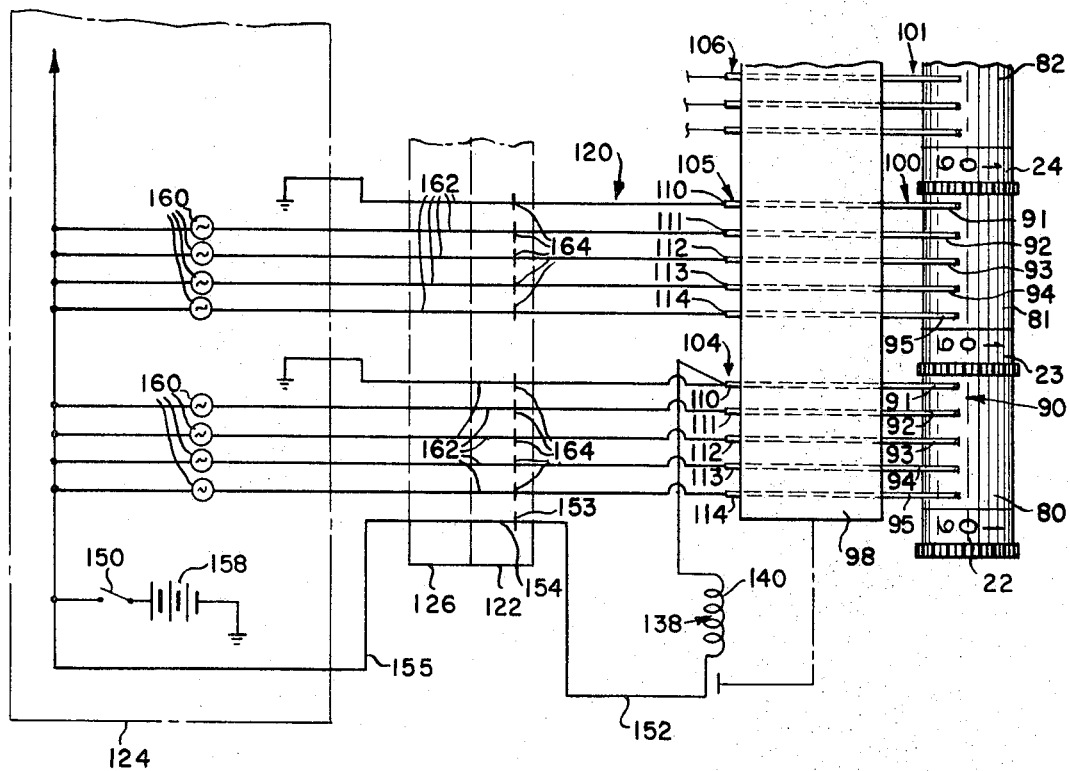

United States Patent Office 3,534,619
Patented Oct. 20, 1970

3,534,619
REGISTER DRIVE MEANS
Ray Sutherland, Hopwood, and Elmer F. Painley and Eugene M. Weinberger, Uniontown, Pa., assignors to Rockwell Manufacturing Company, Pittsburgh, Pa., a corporation of Pennsylvania
Filed July 5, 1968, Ser. No. 742,698
Int. Cl. F16h 27/04
U.S. Cl. 74—84                                    5 Claims

ABSTRACT OF THE DISCLOSURE

A register having a plurality of decimal order counter wheels for totalizing a quantity such as fluid flow and a mechanism for converting the decimal representations of the counter wheels into a binary code to be read out at a remote location. The conversion mechanism comprises a drum fixed to each counter wheel and having predetermined electrically conductive peripheral areas which are engageable by electrically conductive wipers to complete electrical circuits for obtaining the binary read-out. The wipers are pivotally mounted so that they may be disengaged from the drums after a reading is taken. A drive train for the counter includes a mechanism which translates continuous rotary motion of an input shaft into an intermittent or step-by-step rotary motion for advancing at least the lowest order counter wheel in the counter mechanism.

FIELD OF INVENTION

This invention relates to registers and to drive mechanism therefor and is particularly concerned with the type of register which is equipped to provide remote meter readings.

BACKGROUND

Prior to this invention it has been proposed to obtain remote, binary, meter register read-outs by fixing a drum to each counter wheel in the register, by covering predetermined peripheral areas of the drum with an electrically conductive material such that the relationship of the electrically conductive drum surface and electrically non-conductive peripheral drum surfaces affords a coded conversion of the counter wheel registration, and by contacting the drum periphery with a series of wipers which are so arranged in relation to the conductive and non-conductive areas as to transmit coded electrical signals each representing one bit in a multi-bit binary code. These prior proposals were found to suffer from a number of shortcomings such as, for example, the inaccuracy of fluid flow measurements which occurs as a result of the drag which is applied to the drums and, consequently, to the fluid driven metering element by engagement of the wipers with the drums.

SUMMARY OF INVENTION, OBJECTS AND DESCRIPTION OF DRAWINGS

This invention differs from the foregoing type of prior proposals in that the wipers, instead of being stationary, are mounted on a pivotal member so that they can be swung out of engagement with the binary conversion drums after a meter reading is taken. In doing so, the objectionable drag applied when the wipers contact the drums is eliminated during the periods between meter readings.

One of the major objects of this invention therefore resides in the provision of a novel drum and wiper type mechanism for converting the analog representations of the register into binary or other coded representations without applying objectionable drags to the register and the meter during the periods between meter readings.

This invention further provides a novel circuit and structural arrangement whereby the wipers are moved into engagement with the drums simultaneously with an actuation that conditions a meter read-out device to read out in binary or other coded form the coded electrical signals transmitted upon engagement of the wipers with the drums. In one embodiment of this invention, a portable meter reader is adapted to be plugged into a socket which is connected to the wipers. A switch, which is selectively actuated in the meter reader circuit to complete electrical circuits for indicators, such as lamps for example, also operates a solenoid which shifts the wiper arms into operative engagement with the drums. As soon as the reading is taken, the switch is operated to de-energize the solenoid, releasing the wiper for disengagement from the drums by such suitable means as a spring.

Another major object of this invention is to provide a novel counter drive mechanism which translates the continuous rotary motion of a meter driven shaft into an intermittent or abrupt step-by-step rotary motion for advancing at least the lowest order counter wheel in the register.

The foregoing object avoids ambiguities in the registration provided by the meter register. It also ensures that the remote binary read out more closely conforms to the total registered by the counter mechanism.

Further objects of this invention will appear as the description proceeds in connection with the appended claims and annexed drawings wherein:

FIG. 1 is a perspective view of one particular application showing the meter register of this invention in conjunction with a portable meter reader for reading out the meter registration at a remote location;

FIG. 2 is a plan view of the meter register of this invention with the register casing removed;

FIG. 3 is a section taken substantially along lines 3—3 of FIG. 2;

FIG. 4 is a section taken substantially along lines 4—4 of FIG. 2;

FIG. 5 is a section taken substantially along lines 5—5 of FIG. 2; and

FIG. 6 is an electrical circuit diagram of the meter reader and read-out register shown in FIG. 1.

DETAILED DESCRIPTION

Referring now to the drawings and more particularly to FIG. 2, the meter register of this invention comprises a plural order, pinion type carry-over counter mechanism 20 comprising a series of counter wheels 22, 23, 24, and 25 which may respectively represent the units, tens, hundreds, and thousands of a multi-digit number in decimal form. Additional or fewer wheels may be employed as desired.

Mechanism 20 is of generally conventional construction, having a non-rotatable, axially fixed shaft 26 on which counter wheels 22–25 are journalled. Suitable pinion type assemblies 27 for performing the usual carry operations are mounted on a common shaft 28 and are operatively connected between wheels 22 and 23, wheels 23 and 24, and wheels 24 and 25.

A volumetric fluid flow meter 30 (see FIG. 1) of conventional construction comprises a fluid driven metering element 31 for driving a rotatable shaft or member 32 (FIG. 3) at a rotational rate proportional to the volumetric rate of fluid flow through the meter. Shaft 32 is operatively connected to counter 20 by a drive mechanism 34 (FIG. 3).

As shown in FIGS. 3 and 4, mechanism 34 comprises a shaft 36 which is coupled to shaft 32 for rotation therewith. Shaft 36 rotatably extends vertically through a bore in a support block 38 which is suitably fixed against displacement. The upper end of shaft 36 is journalled in a horizontal arm 39 of a rigid mounting bracket 40. Bracket 40 is fixed to support block 38. Shaft 36 is confined against axial displacement by any suitable means.

Still referring to FIG. 3, a helically threaded worm gear 42 is coaxially mounted on shaft 36 between support block 38 and arm 39. By suitable means such as coacting longitudinal sets of splines 44 and 45, which are respectively integral with gear 42 and shaft 36, gear 42 is non-rotatably secured to shaft 36, when being axially slidable thereon between support block 38 and arm 39.

The bottom or downwardly directed face of gear 42 is integrally formed with a cam surface 48 which rides on a follower 50. A helically coiled spring 52 peripherally surrounding shaft 36 is compressed between arm 39 and the top or upwardly directed face of gear 42. Spring 52 reacts against arm 39 to bias gear 42 axially downwardly to seat cam surface 48 on follower 50.

Still referring to FIG. 3, gear 42 meshes with a counter input pinion gear 54 which is fixed to the lowest order counter wheel 22 and which is coaxial with shaft 26. The rotational axis of the assembly of shaft 36 and gear 42 is perpendicular to the axis of shaft 26 and parallel with a line that is tangent to gear 54.

As best shown in FIG. 4, cam surface 48 is formed with a continuous, uniformly sloped, gradually inclined section 56 extending 360 degrees circumferentially around shaft 36 at a uniform radius. The adjacent ends of section 56 are joined together by a vertical fall shoulder 58. Shoulder 58 is in a radial plane containing the axis of gears 42. Starting from the base of shoulder 58, the camming surface of section 56 continuously and smoothly rises to the region where the opposite end of section 56 joins to the lowermost end of shoulder 58.

When shaft 36 is rotated in a counterclockwise direction as viewed from FIG. 2, gear 42, through engagement of cam section 56 with follower 50 climbs axially upwardly on follower 50. In doing so, gear 42 compresses spring 52 until such time that the raised end 60 of cam section 56 rides off follower 50. When this occurs, gear 42 is abruptly returned to its initial, lowered axial position shown in FIG. 3 under the bias exerted by spring 52. The energy stored in spring 52 is sufficient to force gear 42 axially downwardly with a snap-like action.

Thus, for each revolution of shaft 36, gear 42 will gradually be raised a predetermined axial distance and at the end of each revolution, it will abruptly be forced down to its initial position as the raised end 60 of the cam section rides off follower 50. Since shoulder 58 extends vertically at generally right angles to the adjoining ends of cam section 56, there will be practically no rotational movement of gear 42 as it is forced downwardly when the raised cam end 60 rides off follower 50. The axial displacement of gear 42 in either direction will, of course, be equal to the vertical length of shoulder 58.

The pitch of gear 42 is such that as shaft 36 rotates and is cammed axially upwardly, the helical tooth on gear 42 slidably rides through the spaces between the teeth of gear 54 without imparting rotational motion to gear 54. However, when gear 42 reaches the end of each revolution and is forced downwardly by spring 52, the helical tooth on gear 42 meshes with a tooth on gear 54 and in pulling downwardly causes gear 54 to rotate through a predetermined angle in a counterclockwise direction as viewed from FIG. 3. For example, the gear configuration may be such that gear 54 is rotated through an angle equal to the arc between the centerlines of adjacent gear teeth.

From the foregoing it is clear that mechanism 34 translates the continuous rotary motion of shaft 32 into an intermittent or step-by-step, snap-like motion, the latter being imparted through engagement of gears 42 and 54 to advance the lowest order counter wheel 22. Each revolution of gear 42 will advance wheel 22 by one digit.

As shown in FIGS. 2 and 3, follower 50 comprises a pawl which is mounted on a post 64 for pivotal movement about an axis extending parallel to the rotational axis of shaft 36. Follower 50, as viewed from FIG. 2, is biased in a clockwise direction and into abutment with a fixed stop shoulder 66 by a spring 68. With this construction, follower 50 is maintained in yieldable abutment with shoulder 66 as gear 42 is rotated in its proper, counterclockwise, counter-actuating direction. If gear 42 is rotated in the opposite direction by running meter 30 backwards for example, the advancement of the vertical cam shoulder 58 into engagement with follower 50 pivots the follower against the bias of spring 68 and out of the cam's path. As a result, damage to the follower or other parts is avoided.

As shown n FIG. 2, each of he shafts 26 and 28 is mounted at opopsite ends in support brackets 70 and 71. Brackets 70 and 71 and suport block 38 are suitably fixed in a register casing which is indicated at 72 in FIG. 1 and which receives mechanisms 20 and 34. The positions of counter wheels 22–25 may be observed through a window indicated at 74.

The advantage of imparting a snap-like, step-by-step advancement to counter wheel 22 by mechanism 34 in that it avoids ambiguous registrations. Without mechanism 34, counter wheel 22 would rotate continuously and may therefore be in an intermediate position at the time a reading is taken where none of the digits on the wheel perfectly align with an indicator or a read-out location. This could lead to serious error when wheel 22 is advanced to a position where the "9" digit has advanced past read-out location, but where the zero has not been reached.

For example, the register may actually be between 2039 and 2040, but in taking a reading, the meter reader may, under such conditions, easily observe the registration to be 2030 because the "3" on wheel 23 will be present and a zero on counter 22 will be partially present just before the counter wheel position is reached where the carry-over operation is performed to advance wheel 23 to its next position. The step-by-step, snap-like counter drive which is provided by mechanism 34 is also of importance for binary read-out arrangement which will now be described.

As shown in FIG. 2, counter wheels 22–25 are respectively fixed to drums 80, 81, 82, and 83 of equal and uniform diameters. Drums 80–83 are each formed with a uniformly diametered, electrically non-conductive cylindrical, peripheral surface and are each coxially journalled on shaft 26 in axial alignment with wheels 22–25.

Drum 80 is coated at predetermined peripheral areas with a suitable electrically conductive material to form an electrically conductive covering 86 of coded, predetermined configuration. The remaining and exposed electrically non-conductive periphery of drum 80 is indicated at 88. The configuration of covering 86 is such that it cooperates with the drum periphery 88 to effect a conversion of the analog representation of drum 80 and, consequently, of counter wheel 22 into correspondingly binary number representations by employing a wiper assembly 90.

The coded configuration of covering 86 may be the same as that described in United States Letters Pat. No. 3,046,534 issued on July 24, 1962 for Remote Reading Apparatus. Suitable coded configurations for effecting a conversion to binary representations are particularly shown in FIGS. 4 and 6 of Pat. No. 3,046,534 to which reference is made in the event that a more detailed description is required.

Drums 81–83 are of the same construction as drum 80 and are each coated with an electrically conductive material to provide coverings which are of the same configuration as covering 86 for performing the same function. Like reference numerals have therefore been applied to designate like portions of the drums and coverings.

Still referring to FIG. 2, wiper assembly 90 consists of five electrically conductive drum-engaging wiper arms 91, 92, 93, 94, and 95 each constituting an elongated, flexure spring-like, rod member which is fixed to a mounting plate 98. Wiper arms 91–95 are parallel, are spaced apart from each other, are electrically insulated from each other, and extend at right angles with respect to the rotational axis of drum 80.

Wiper assemblies 100, 101, and 102 respectively cooperating with drums 81, 82, and 83 are of the same construction as wiper assembly 90. Accordingly, like reference numerals have been applied to designate like arms of assemblies 100–102.

With continued reference to FIG. 2, wiper arms 91–95 of assembly 90 are adapted to respectively engage axially spaced apart circumferential regions of drum 80 as the latter is rotated with counter wheel 22. As drum 80 is rotated, therefore, covering 86 will move into and out of contact with each of arms 92–95 in accordance with the rotation of counter wheel 22. In doing so, wiper arms 92–95 will each engage either the electrically conductive covering 86 or the non-conductive drum periphery 88 depending upon the position to which drum 80 has been rotated. As shown, covering 86 is stepped in relation to the digits on counter wheel 22 such that the presence or absence of a circuit completion between arms 92–95 and covering 86 provides a conversion of the decimal mechanical registration of wheel 22 into and electrical binary code in terms of a 4-bit 8–4–2–1 binary code, with the electrical drum-to-arm circuit completion of each of the arms 92–95 representing one of the bits. Thus for zero registration of counter wheel 22, as shown in FIG. 2, wiper arms 92–95 all engage the electrically non-conductive drum periphery 88 with the result that the absence of the drum-to-wiper arm circuit completions provides a corresponding binary representation. For further details as to the manner in which circuits are completed between covering 86 and arms 92–95 to provide binary representations of the counter digits 1–9, reference is made to the aforesaid Pat. No. 3,046,536.

Since the stepped configuration of covering 86 is closely related to the positions of digits on counter wheel 22, it will be apreciated that the abrupt, intermittent rotary advancement imparted to wheel 22 by drive mechanism 34 ensures that the presence or absence of drum-to-wiper circuits for wipers 92–95 closely conforms to the position of wheel 22. The coded electrical signals transmitted by wipers 92–95 therefore accurately represent the registration represented by wheel 22.

The region of covering 86 engaged by wiper arm 91 extends completely around drum 80 with the result that there will be an uninterrupted circuit completion between arm 91 and covering 86 throughout 360 degrees of drum rotation. Wiper arm 91 thus provides a common electrical connection for purposes to be explained in detail later on.

The operative association of wiper assemblies 100–102 relative to covering 86 and peripheries 88 of their drums 81–83 is the same as that just described for drum 80 and wiper assembly 90. As a consequence, the circuit completions for wiper assemblies 100–102 provide 4-bit binary read outs of the registration positions of counter wheels 23–25 respectively. In each case there is an uninterrupted electrical circuit completion between the coverings 86 on drums 81–83 and wiper arms 91 of assemblies 100–102.

As shown in FIG. 2, plate 98 extends parallel to the axis of shaft 26, and wiper arms 91–95 of assemblies 90 and 100–102 extend perpendicularly from the edge of plate 98 facing counter mechanism 20. Along the oppositely facing edge of plate 98 there are four electrical terminal banks respectively indicated at 104, 105, 106, and 107.

Bank 104 consists of five terminals 110, 111, 112, 113, and 114 which are independently connected by separate electrical conductors 116 respectively to wiper arms 91–95 of assembly 90. Banks 105–107, which are respectively associated with wiper assemblies 100–102, also have five terminals each similar to bank 104. Like reference numerals have been applied to designate corresponding terminals in each bank. Conductors indicated again at 116 connect one terminal in each bank to a corresponding wiper arm in the associated wiper assembly in the same manner as described for wiper assembly 90 and bank 104. Plate 98 may be formed from electrical non-conductive material so that the wiper arm-to-terminal circuits are electrically isolated from each other.

Terminals 110–114 in each bank 104–107 are connected to separate electrical conductors which are electrically insulated from each other in a multi-conductor cable 120 of suitable form. The conductors of cable 120, especially in regions adjacent to the connections to the terminals in banks 104–107, are flexible for a purpose to be explained later on.

As shown in FIG. 1, cable 120 extends through casing 72, which encloses the circuitry and structure just described, to a multi-terminal socket 122 which may be located on the exterior of a building in which meter 30 is installed. Each of the conductors in cable 120 is connected to a separate terminal in socket 122. A portable meter reader 124, which can be carried to the site by a meter reader, has a plug 126 which is adapted to be inserted into socket 122. Plug 126 has a series of electrically insulated terminals corresponding in number to and adapted to engage the electrically insulated terminals in socket 122.

Any suitable circuit completion indicator may be employed in reader 124 such as that illustrated in FIG. 5 of the aforesaid Pat. No. 3,046,534. Furthermore, it will be appreciated that instead of providing a remote connection for a portable meter reader which is brought to the site, cable 120 may be connected to a central meter reading station which is equipped to read meter registrations at a number of differently located, remote meter sites.

Referring again to FIG. 2, the assembly of plate 98 and wiper assemblies 90 and 100–102 is mounted on bracket 70 and a support member 130 for rocking or pivotal movement by a pair of pivot pin assemblies indicated at 132 and 133. Support member 130 is fixed to block 38 as shown.

The axis about which the assembly of plate 98 and wiper assemblies 90 and 100–102 is rockable is parallel to and spaced from the longitudinal axis of shaft 26. When plate 98 is pivoted downwardly to the position shown in FIG. 5, the wiper arms of assemblies 90 and 100–102 all engage their respective drums 80–83 for reading out the registration of the counter mechanism 20. When plate 98 is pivoted upwardly or in a counterclockwise direction as viewed from FIG. 5, wiper assemblies 90 and 100–102 are swung upwardly and out of engagement with drums 80–83. As a result, wiper assemblies 90 and 100–102, instead of being stationary, may be moved into engagement with drums 80–83 only when it is desired to take a meter reading. This construction has two major advantages.

First, wiper assemblies 90 and 100–102 may be moved out of engagement with drums 80–83 except for the short period of taking a reading so that they do not apply an objectionable drag to the counter mechanism and through drive mechanism 34 to meter 30. Elimination of such a drag is of particular importance where the type of fluid flow meter employed has a fluid driven metering element such as an oscillating disc or piston or a rotatable, bladed rotor. In such types of meters, any drag applied to the metering element either directly or through mechanical and/or magnetic coupling means impairs the accuracy of the flow measurements provided by the meter because the metering element, being driven only by fluid flow, will turn at a rate which is slower than the rate ideally representing the volumetric flow rate.

Second, wear of the wiper arms and the relatively thin coatings indicated at 86 is minimized, for wipers 91–95 will engage the coatings for a very short time.

The arrangement for pivoting plate 98 preferably comprises a solenoid 138 (see FIGS. 5 and 6) having a coil 140 and a cooperating core 142. Coil 140 is fixed in place within casing 72 and core 142 is secured to plate 98 as best shown in FIG. 5. A suitable spring 144 (FIG. 5), which is compressed between a fixed surface and plate 98 normally biases plate 98 to its position where wiper assemblies 90 and 100–102 are swung out of engagement with drums 80–83.

By energizing coil 140, core 142 is attracted to pivot plate 98 downwardly against the bias of spring 144 and to a position where wiper assemblies 90 and 100–102 engage drums 80–83 for taking a meter reading. When coil 142 is de-energized, spring 144 biases plate 98 upwardly to the position where wiper assemblies 90 and 100–102 are out of engagement with drums 80–83.

Referring to FIG. 6, coil 140 is connected in the meter reader circuit such that it is energized when reader 124 is conditioned to indicate the counter mechanism registration as by closing a switch 150. As shown, one terminal of coil 140 is connected by an electrically insulated conductor 152 to an electrically isolated terminal 153 in socket 122. Conductor 152 preferably forms a part of cable 120.

Plug 126 has a separate complemental terminal 154 adapted to contact terminal 153 when the plug is inserted into socket 122. An electrical conductor 155 connects terminal 154 to one terminal of switch 150, the other terminal of which is connected to a terminal of a suitable power supply source such as a battery 158 which forms a part of reader 124. The other terminal of battery 158 is connected to ground, and the other terminal of coil 140 is either connected to ground or to one of the terminals 110 in banks 104–107. All of the terminals 110, which are connected to wiper arms 91, are connected to ground.

As shown in FIG. 6, there is a series of four lamps 160 for each of the wiper assemblies 90 and 100–102. One terminal of each lamp 160 is connected through switch 150 to battery 158. The other terminals of lamps 160 are respectively connected to separate terminals indicated at 162 in plug 126. Terminals 162 separately contact complemental terminals indicated at 164 in socket 122. Terminals 164 are connected by separate conductors in cable 120 to terminals 111–114 in each of the banks 104–107.

To take a meter reading, plug 126 is inserted into socket 122, and switch 150 is closed. In doing so, an energizing circuit for coil 140 is completed to pivot plate 98 downwardly to its position where wiper assemblies 90 and 100–102 engage drums 80–83. When this occurs, those wiper arms 91–95 which contact coverings 86 provide for the completion of a circuit through coverings 86, wiper arms 91 and ground to battery 158 for illuminating their associated lamps 160 to which they are electrically connected. The lamps 160 connected to those wiper arms which engage the electrically non-conductive drum periphery 88 will not be illuminated because the circuit is not completed to the grounded wiper arms 91.

Lamps 160 may be observed through a window 170 (FIG. 1) in reader and illumination of each set of the lamps provides a binary representation of the registration position of the associate counter wheel.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a fluid flow meter register having at least one counter wheel and an input shaft adapted to be continuously rotated by fluid flow through a meter, a mechanism drive connecting said shaft to said counter wheel for converting the continuous rotary motion of said shaft into intermittent rotary motion and for transmitting said intermittent rotary motion to advance said counter wheel, said mechanism comprising a first gear axially slidably but non-rotatably mounted on said shaft, means coacting with said first gear for axially displacing said first gear in a first direction during rotation of said shaft through a predetermined angle and for abruptly axially displacing said first gear relative to said shaft and in the opposite direction each time said shaft completes its rotation through said predetermined angle, and a second gear non-rotatably connected to said counter wheel and coacting with said first gear to be rotated through a predetermined angular distance only when said first gear is axially displaced in said opposite direction, whereby intermittent rotational motion is imparted to said second gear and said counter wheel as said first gear is rotated continuously with said shaft.

2. In a fluid flow meter register defined in claim 1 wherein said first gear is a worm gear and wherein said means coacting with said first gear comprises spring means axially biasing said worm gear in said opposite direction and cooperating cam and follower means for axially urging said worm gear in said first direction to store energy in said spring means as the assembly of said shaft and worm gear is rotated through said predetermined angle and to abruptly release said worm gear for movement in the opposite direction by said spring means at the end of shaft rotation through said predetermined angle, the tooth on said worm gear being effective to slide between teeth of said second gear without imparting rotation thereto as said worm gear is rotated and concomitantly axially advanced in said first direction, said worm gear tooth meshing with and pulling on said second gear as said worm gear is axially displaced in said opposite direction to rotate said second gear and said counter wheel through said angular distance.

3. In a fluid flow meter register defined in claim 2 wherein said spring means engages one end of said worm gear and said cam means is rigid with the opposite end of said worm gear.

4. A fluid flow meter register assembly having at least one counter wheel and an input shaft adapted to continuously be rotated by fluid flow through a meter, a mechanism drive connecting said shaft to said counter wheel for converting the continuous rotary motion of said shaft into intermittent rotary motion and for transmitting said intermittent rotary motion to advance said counter wheel, said mechanism comprising a first member axially slidably but non-rotatably mounted on said shaft, camming surface means on said first member, a pivotaly mounted follower seated against said surface means and coacting therewith for axially displacing said first member in first direction during rotation of said shaft through a predetermined angle in a predetermined forward driving direction, said surface means having a portion extending essentially parallel to the longitudinal axis of said shaft along which said first member is axially slidable, said portion coacting with said follower for enabling said first member to axially be displaced in the opposite direction upon rotation through said predetermined angle, a second member operatively engaged with said first member and coacting therewith to be displaced only when said first member is axially displaced in one predetermined direction for imparting intermittent rotational motion to said counter wheel, means providing a stop abutment surface for limiting pivotal movement of said follower in one predetermined direction, and resilient means biasing said follower into abutment with said stop surface and enabling said follower to pivotally be displaced in the opposite direction, said portion being abuttable with said follower to pivot said follower in said opposite direction and to move it out of the path of said camming surface means against the biasing force exerted by said resilient means when said shaft is rotated in a direction opposite to said forward driving direction.

5. A fluid flow meter register assembly having at least one counter wheel and an input shaft adapted to continuously be rotated in a predetermined forward driving direction by fluid flow through a meter, a mechanism drive connecting said shaft to said counter wheel for rotating said counter wheel, said mechanism comprising coacting, interengaging, relatively movable camming surface and follower means for converting the continuous rotary motion transmitted by said shaft into intermittent rotary motion to intermittently advance said counter wheel in response to rotation of said shaft through a predetermined angle in said forward direction, and means enabling said follower means to be moved out of the path of said camming surface means by a portion of said camming surface means when said shaft is rotated in a direction that is opposite to said forward driving direction.

References Cited
UNITED STATES PATENTS

| | | | |
|---|---|---|---|
| 966,090 | 8/1910 | Hamacek | 74—84 |
| 3,390,583 | 7/1968 | English | 74—84 |

MILTON KAUFMAN, Primary Examiner